US012722280B2

(12) United States Patent
Perez Gil De La Serna et al.

(10) Patent No.: US 12,722,280 B2
(45) Date of Patent: Sep. 1, 2026

(54) SENSORIZED EXOSKELETON SYSTEM

(71) Applicant: GESNAER CONSULTING, S.L.N.E, Madrid (ES)

(72) Inventors: Juan Manuel Perez Gil De La Serna, Madrid (ES); Luis Enrique Moreno Lorente, Leganes (ES); Dorin Sabin Copaci, Leganes (ES); Sara Crespo Bartolome, Madrid (ES)

(73) Assignee: GESNAER CONSULTING, S.L.N.E, Madrid (ES)

( * ) Notice: Subject to any disclaimer, the term of this patent is extended or adjusted under 35 U.S.C. 154(b) by 355 days.

(21) Appl. No.: 18/705,522

(22) PCT Filed: Oct. 17, 2022

(86) PCT No.: PCT/EP2022/078801
§ 371 (c)(1),
(2) Date: Apr. 26, 2024

(87) PCT Pub. No.: WO2023/072652
PCT Pub. Date: May 4, 2023

(65) Prior Publication Data

US 2026/0151896 A1 Jun. 4, 2026

(51) Int. Cl.
*B25J 9/00* (2006.01)
*B25J 13/08* (2006.01)
(Continued)

(52) U.S. Cl.
CPC ............... *B25J 9/0006* (2013.01); *B25J 9/00* (2013.01); *B25J 13/085* (2013.01); *B25J 13/088* (2013.01);
(Continued)

(58) Field of Classification Search
CPC . B25J 9/0006; B25J 9/00; B25J 9/0024; B25J 9/06; B25J 9/08; B25J 9/0018;
(Continued)

(56) References Cited

U.S. PATENT DOCUMENTS 5,330,516 A * 7/1994 Nathan .............. A61N 1/36003 607/48
5,501,656 A * 3/1996 Homma .................. A61H 1/02 606/241
(Continued)

FOREIGN PATENT DOCUMENTS

EP 2150175 B1 7/2014
EP 3178619 A1 * 6/2017 ........... B25J 9/0006
(Continued)

OTHER PUBLICATIONS

Machine translation of written description and claims of KR101630570B1 via google patents (Year: 2015).*
(Continued)

*Primary Examiner* — Bradley H Philips
*Assistant Examiner* — Tyler A Raubenstraw
(74) *Attorney, Agent, or Firm* — MARSHALL, GERSTEIN & BORUN LLP

(57) ABSTRACT

A sensorized exoskeleton system for enhancing physical performances and/or for providing assistance with limb movement in regard to load-involved tasks. The system includes at least one sensorized wearable unit including a plurality of strain sensors, an actuation unit, a plurality of mechanical elements fixed to the ceiling or other fixed structure allowing the actuation unit to move horizontally on two rails and to rotate through 360°, a structure that moves along a vertical axis and that mechanically and electrically connects the sensorized wearable unit to the actuation unit, a plurality of rotative/position sensors installed throughout
(Continued)

the at least one sensorized wearable unit, the structure and the actuation unit and at least one electronic microcontroller that processes the signals sent by the system sensors.

15 Claims, 8 Drawing Sheets

(51) Int. Cl.
*A61H 1/00* (2006.01)
*A61H 1/02* (2006.01)

(52) U.S. Cl.
CPC .................. *A61H 1/00* (2013.01); *A61H 1/02* (2013.01); *A61H 2201/123* (2013.01); *A61H 2201/165* (2013.01); *A61H 2205/06* (2013.01); *A61H 2205/062* (2013.01)

(58) Field of Classification Search
CPC .......... A61H 1/00; A61H 1/02; A61H 1/0203; A61H 1/0207; A61H 1/0274; A61H 1/0277; A61H 2201/12; A61H 2201/1207; A61H 2201/123; A61H 2201/1238; A61H 2201/16; A61H 2201/1635; A61H 2201/1638; A61H 2201/165; A61H 2201/1671; A61H 2201/1673; A61H 2205/06; A61H 2205/062; A61H 2205/065
See application file for complete search history.

(56) References Cited

U.S. PATENT DOCUMENTS 5,601,527 A * 2/1997 Selkowitz .............. A61H 3/008 482/69
6,506,172 B1 * 1/2003 Hepburn .............. A61H 1/0274 601/5
6,821,233 B1 * 11/2004 Colombo ............. A61H 1/0262 601/5
8,414,513 B1 * 4/2013 Earle ....................... A61F 5/042 602/33
9,144,528 B2 * 9/2015 Agrawal .............. A61H 1/0274
2008/0293551 A1 * 11/2008 Tong .................... A61H 1/0237 482/136
2010/0113987 A1 * 5/2010 Agrawal .................. B25J 9/104 601/33
2010/0145238 A1 * 6/2010 Stienen .............. A63B 21/4047 601/33
2010/0160986 A1 * 6/2010 Simmons ............... A61H 23/02 607/3
2011/0164949 A1 7/2011 Kim et al.
2012/0172769 A1 * 7/2012 Garrec ................... B25J 9/0006 601/33
2017/0246021 A1 * 8/2017 Jaeger ..................... A61F 5/042
2017/0296418 A1 * 10/2017 Lee ...................... A61H 1/0281
2019/0336380 A1 * 11/2019 Xue ..................... A61H 1/0285
2019/0336382 A1 * 11/2019 Lan ........................ B25J 9/0006
2020/0069441 A1 * 3/2020 Larose ...................... A61F 2/70
2020/0146923 A1 * 5/2020 Doyle ..................... A61F 5/013
2021/0161748 A1 6/2021 Kim et al.
2021/0298936 A1 * 9/2021 Peisner ..................... A61F 2/72
2022/0362091 A1 * 11/2022 Yamazaki .............. A61B 5/112

FOREIGN PATENT DOCUMENTS

EP 3297579 A1 3/2018
KR 101630570 B1 * 6/2016 ........... A61H 1/0274
WO WO-2021/010821 A1 1/2021

OTHER PUBLICATIONS

International Search Report and Written Opinion for PCT/EP2022/078801, dated Jan. 18, 2023.

* cited by examiner

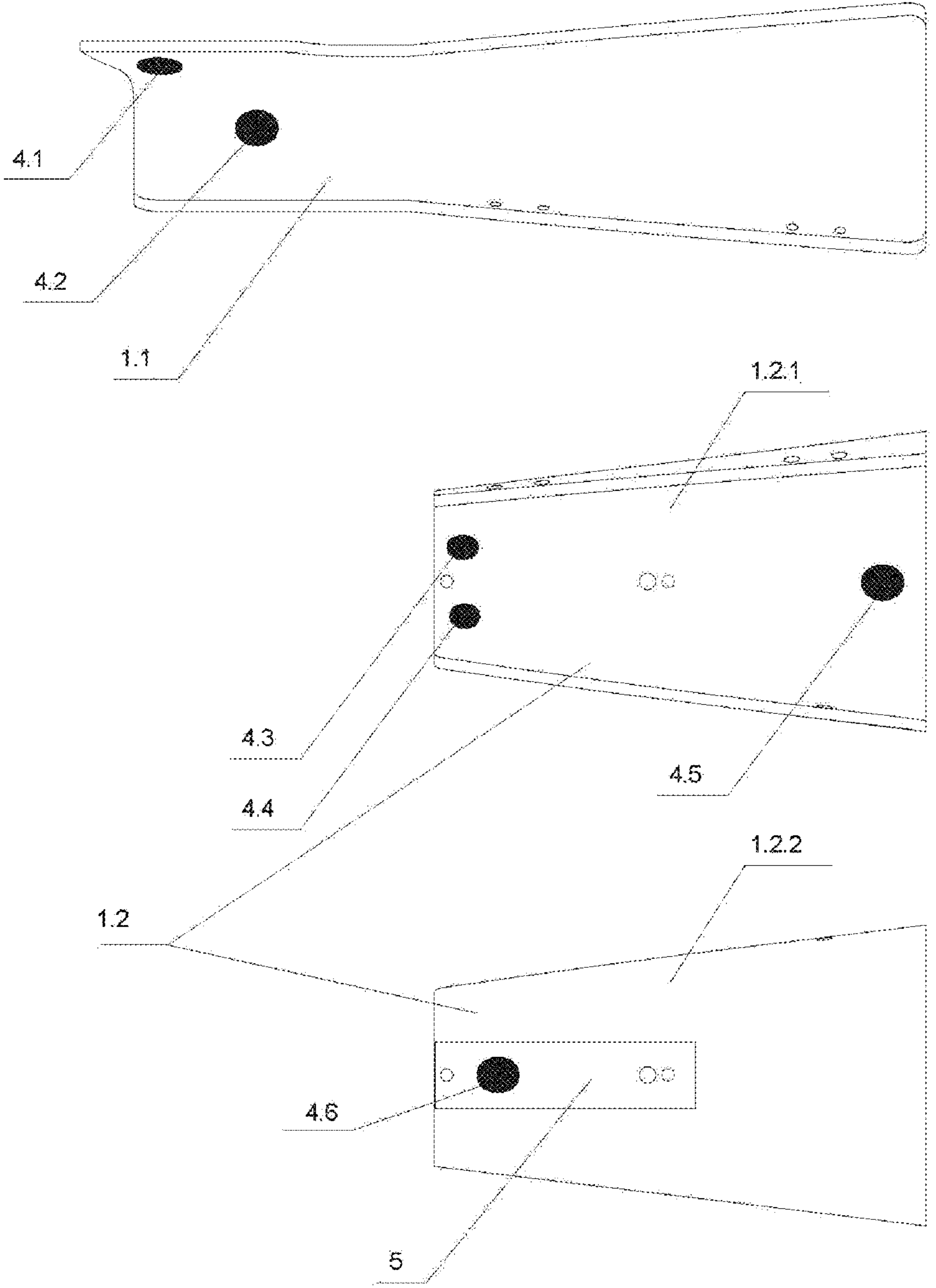
Figure 2.1

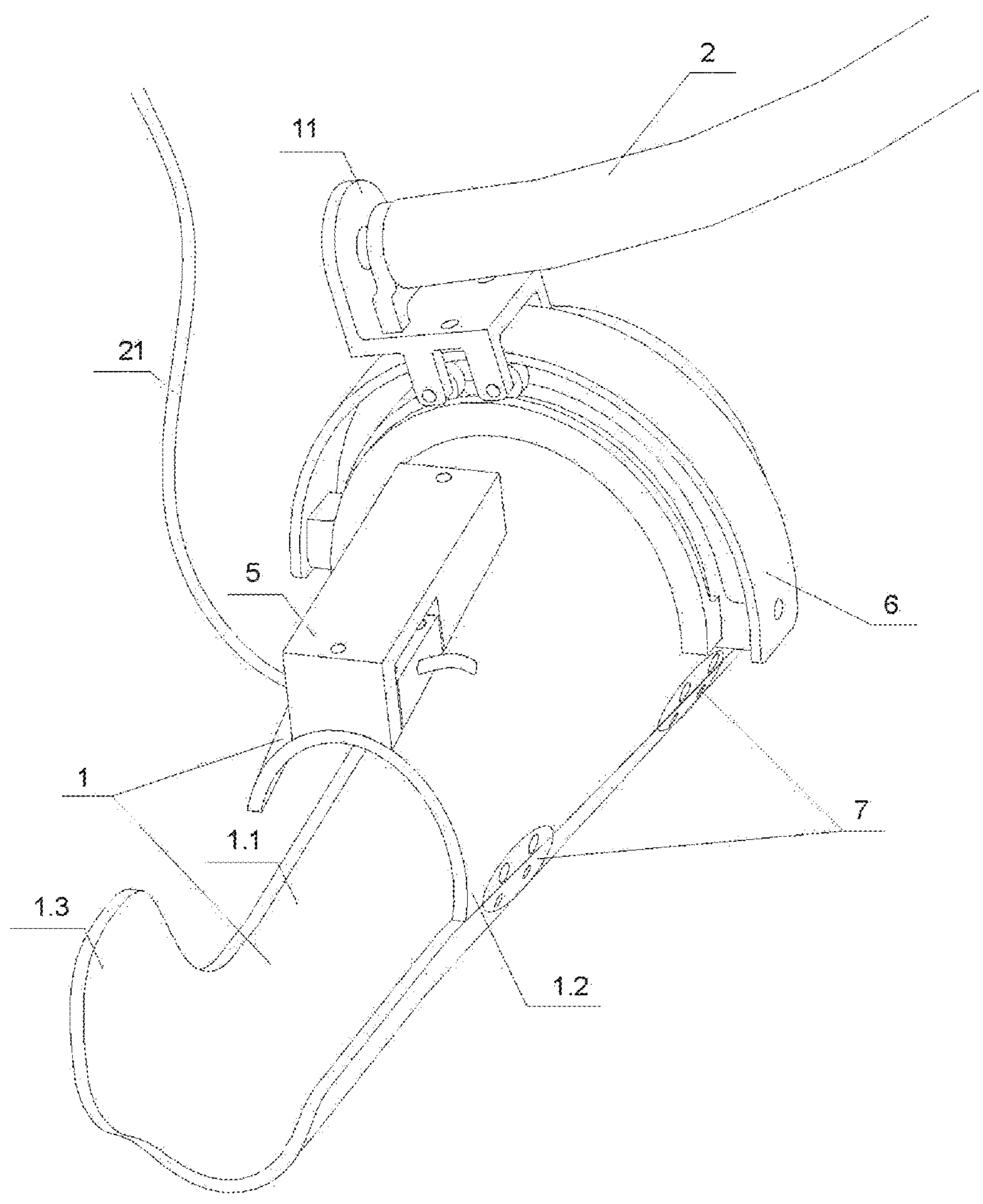
Figure 2.2

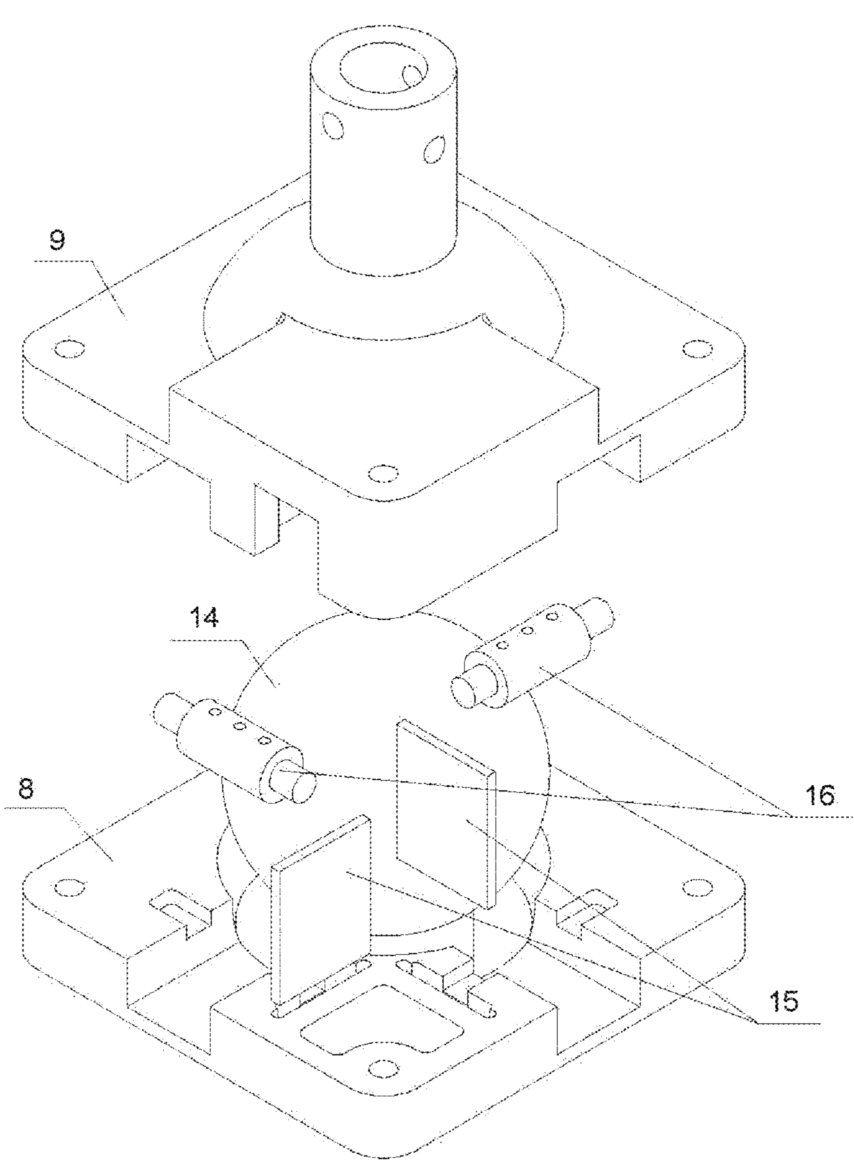
Figure 3.1

SENSORIZED EXOSKELETON SYSTEM

FIELD OF THE INVENTION

This invention relates to a sensorized exoskeleton system, and to be more specific, this invention pertains to sensorized exoskeletons for load handling tasks.

The present invention specifically relates to an exoskeleton structure that attaches to at least one user's limb, and it is used for assistance with limb movement for load-involved tasks. In particular, the invention includes at least one sensorized wearable unit put on a user's forearm, and a mechanical structure that allows the connection of the wearable unit with the motors that produce the induced movement.

BACKGROUND OF THE INVENTION

Nowadays, according to their functionality, exoskeleton systems can be classified by their purposes in: rehabilitation, haptics, assistive devices, teleoperations, and power augmentation devices. All these systems can be described in a generic way as wearable devices that have been developed to assist and/or enhance the physical performance of the wearer, and which work in coordination with the user.

In regard to this matter, and concerning the exoskeletons which have a power augmentation purpose, the former designs and inventions presented are often portable and adjustable devices, since it is required the free mobility of the user, as it can be seen in the patent document EP3297579.A1. This document discloses an arm supporting exoskeleton comprising a shoulder base coupled to an arm link mechanism. The arm link mechanism comprises a proximal link and a distal link.

In particular, with this type of portable devices, the user is expected to carry all the weight of the exoskeleton, which can lead to increased fatigue of other body parts that hold that weight. These types of devices generally need to be individually adapted to each person for their best use, due to the variation of body dimensions regarding each user. In addition, particular devices are vulnerable to be misplaced and/or stolen.

Exoskeleton systems that are fixed to elements other than the specific user's body (such as structures, ceilings, walls, stalls, tables, and analogous items) are also known in the state of the art, as for example the patent document EP2150175.A1. These fixed exoskeleton systems are generally adjustable to one or more body parts of the user, but the fixation may limit or reduce the mobility of the user. However, their utilization compared to the portable exoskeletons result in a reduction of weight of the entire device on the body of the user, and additionally, a reduction of misplacements and thefts of the device. This invention mentioned, however, is directed to assessment, rehabilitation and/or research, whereas the present invention is focused on load-involved tasks, reducing the weight of the load carried by an operator.

EP3646843 discloses an apparatus for assisting physical movement including a body wearing unit put on a specific body of a user, a strap linked to one side of the body wearing unit, a strain sensor provided on the strap to measure a tension applied to the strap, and a strap driving unit linked to the strap to wind or unwind the strap depending on rotation. The strap driving unit rotates in a stationary state such that a reference tension having a specific intensity is applied to the strain sensor, and rotates in a specific direction as the applied tension to the strap becomes higher or lower the reference tension depending on movement of a user.

In regard to the purpose that this document applies, a particular topic of interest is indicated: load handling tasks, and it involves both the assistance of the operators and the enhance of their physical performances. Load handling is an activity that often leads to injuries, especially musculoskeletal, and that can put the workers'health and wellbeing at risk. At present, there are diverse assistance systems for handling heavy loads in different production environments, but in some handling sectors, many package/luggage loading and unloading processes are still carried out manually without any technical help that minimizes the risks of fatigue and/or injuries to the employees.

Regarding this function of load handling tasks, in particular the use of the previous mentioned portable exoskeletons, this could entail an increase of the total weight that the user has to control, both the exoskeleton device and the load that needs to be manipulated. Consequently, this situation should be avoided.

To summarize, the main reasons of the development of systems such as exoskeletons for power augmentation come from the necessity to achieve an increase in physical performances of an operator, to allow them to complete the load-involved tasks reducing possible hazards and risks of fatigue and/or harm.

SUMMARY OF THE INVENTION

This invention is developed due to the need to provide aid and assistance to load handling operators by creating a technological device that enhances their physical performance.

The intention of this invention is to achieve an improvement on the wellbeing of the load-handling operator by reducing the load weight held. Therefore, a reduction of fatigue, harm and any other risks towards the operator caused by carrying weight is achieved as well. In addition, by attaining the reduction of the weights carried, it is also intended to accomplish an increase on the speed of the tasks.

This invention is aimed to be used in any transport terminal or station, including airport terminals, train stations, bus stations or ports, among others, and additionally, it is possible to use this invention in other environments where it is convenient or necessary to establish the interaction between the operator and any form of package, for instance, for loading and/or unloading cargo in factories or logistic centers.

Embodiments of the invention as described in the appended claims, provide an exoskeleton system for enhancing physical strength, capable of effectively achieving a reduction on the weight load.

According to a preferred embodiment, the exoskeleton system for enhancing physical performances and/or for providing assistance with limb movement in regard to load-involved tasks comprises at least one sensorized wearable unit comprising a plurality of strain sensors configured to fit a user's forearm and to allow rotation, flexion, extension, pronation and supination of the user's arm; it also comprises an actuation unit comprising a plurality of electrical, electronic and mechanical elements. A plurality of mechanical elements fixed to the ceiling or other fixed structure allow the actuation unit, to move horizontally on one or more rails and to rotate through 360°. The sensorized wearable unit and the actuation unit are mechanically and electrically connected by means of a structure that can move along a vertical axis. At least one electronic microcontroller processes the signals sent by a plurality of rotative/position sensors and a plurality of strain sensors installed throughout the sensorized wearable unit, the structure, and the actuation unit.

The sensorized wearable unit is configured as a rigid element comprising an upper part and an interchangeable and customisable lower part with a supporting extension to protect the limb of the user and to maintain the articulation immobile. The upper part and the lower part are connected by means of a plurality of hinges and/or a plurality of adaptable fasteners. A plurality of strain sensors are placed on the inner surface of the wearable unit and an exterior support module comprises at least one strain sensor and fixation means for a mechanical cable. In a preferred embodiment, the sensorized wearable unit comprises a sensorized rotative component allowing the user to rotate, flex and extend the arm and a curved rail component allowing the user to pronate and supinate the arm.

The sensorized wearable unit can have different sizes to adapt to the limb of the user.

The plurality of strain sensors placed on the inner surface of the sensorized wearable unit detect the user's action or movement intention by detecting the pressure between the limb and the unit at different points of the sensorized wearable unit, depending on the direction to where the user moves the limb.

In a preferred embodiment, the plurality of strain sensors are Force Sensing Resistors that exhibit a decrease in resistance with increase in force applied to the surface of the sensor.

Each sensorized unit is in contact with the body of the user. Pressure/strain sensors (FSRs) provided on the wearable unit measure the tension applied to them, and a cable-driving unit linked to the wearable unit winds or unwinds the cable to direct user's movements. The rotation of an electric motor rolls up the cable attached to one body wearable unit, which induces the assisted movement of the limb.

In another embodiment, the structure that mechanically and electrically connects the sensorized wearable unit to the actuation unit comprises a hollow and curved tube configured to house electrical/signal cables to transmit the information from sensors to a microcontroller and mechanical cables that carry out mechanical movements of the system induced by motors housed in the actuation unit.

In a further embodiment, the length of the structure can be adjusted to suit the user's height and in that the structure is configured to allow movements of rotation, flexion, extension, adduction, and abduction of the limbs of the user.

An additional motor supports the weight of the structure and moves it vertically to allow the operator to lean over and stand up if needed.

The structure is connected to the sensorized wearable unit through a bearing or any element that allows a rotation, and it is connected to a system that allows the pronation and supination of the arm.

The structure comprises a plurality of position sensors that detect the movement of both the user's limb and his or her position around the operating area.

In a preferred embodiment, the actuation unit comprises a plurality of motors with their respective gearboxes, a plurality of cylinders to wind or unwind mechanical cables depending on the rotation generated by each motor, a plurality of bearings and a plurality of fastening elements for the motors and their gearboxes.

The pressure applied to the sensors, is sent to, and processed by a microcontroller, which then actions the motors of each gearbox separately rotating in one direction or another, which make the mechanical cables wind or unwind from each cylinder.

In a further embodiment of the exoskeleton the plurality of mechanical elements fixed to the ceiling or other fixed structure allowing the actuation unit to move horizontally on two rails and to rotate through 360°, comprise a cylindrical disc attached to the actuation unit and a hollow rectangular plate that contains spherical bearings on the upper surface and on its lower base. The cylindrical disk rotates and slides on the spherical bearings provided on the upper surface of the rectangular plate, and the rectangular plate slides on the rails thanks to the bearings arranged perimetrically on its lower base.

In a further embodiment, the exoskeleton comprises a motor provided in the actuation unit for controlling a mechanical cable attached to the vertical guide, to lift the weight of the structure and the elements connected to it.

The exoskeleton system comprises a microcontroller for processing the signals from the strain sensors, from the rotative sensor at the sensorized unit and from the position sensors actioned by the ball joint by means of a control software, which is embedded in the microcontroller.

BRIEF DESCRIPTION OF THE FIGURES

To complement the description that is being made and in order to help a better understanding of the features of the invention, a set of drawings is attached as an integral part of the description, where, with an illustrative and non-limiting nature, the following has been represented:

FIG. 2.1: Orthographic view of the two parts of the sensorized wearable unit showing the sensor's positions within the unit.

FIG. 2.2: Isometric projection of the sensorized wearable unit showing the elements in charge of the limb's movement: rotation, flexion, extension, pronation, and supination.

FIG. 3.1: Exploded view of the ball joint and the elements inside.

DETAILED DESCRIPTION OF THE INVENTION

While the invention is illustrated and described herein with reference to specific embodiments, this invention is not intended to be limited to the details, terms, terminology, or figures shown. Rather, different modifications may be made in the details within the scope and range of equivalents of the disclosure without departing from the invention. In addition, it will be further understood that some terms used herein specify the presence of stated elements, steps, operations, and/or devices, but do not preclude the presence or addition of one or more other components, steps, operations, devices, and/or the modification on the shape of the elements.

The present invention relates to an exoskeleton system that attaches to at least one user's limb, and it is used for enhancing physical performances and for providing assistance with limb movement in regard to load-involved tasks. The system, object of the invention, may be used in any job in which it is required an interaction between an operator and a load that needs to be handled.

Figure 1:
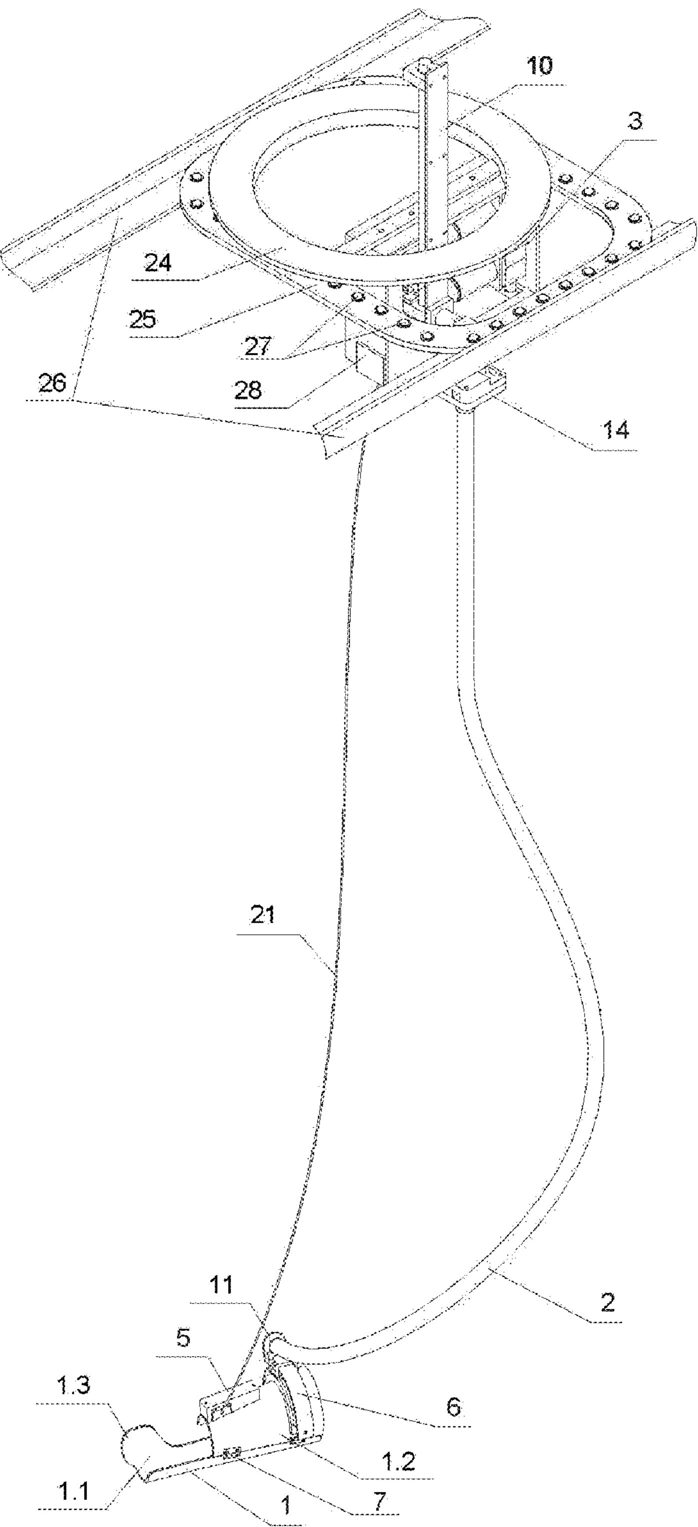
FIG. 1: Isometric projection of the exoskeleton system showing its main elements.

FIG. 1 shows an exemplary embodiment of the exoskeleton system with its main elements assembled, only showing one sensorized wearable unit (1) as schematic figure. This unit is made to be placed at a user's forearm and it allows its pronation, supination, extension, flexion, and rotation movements.

As shown in FIG. 1, one embodiment of the invention includes one or more body sensorized wearable units (1) that can be attached to the upper limbs of a user. As an illustrative example, there is only one sensorized wearable unit (1) shown in FIG. 1.

Figure 2:
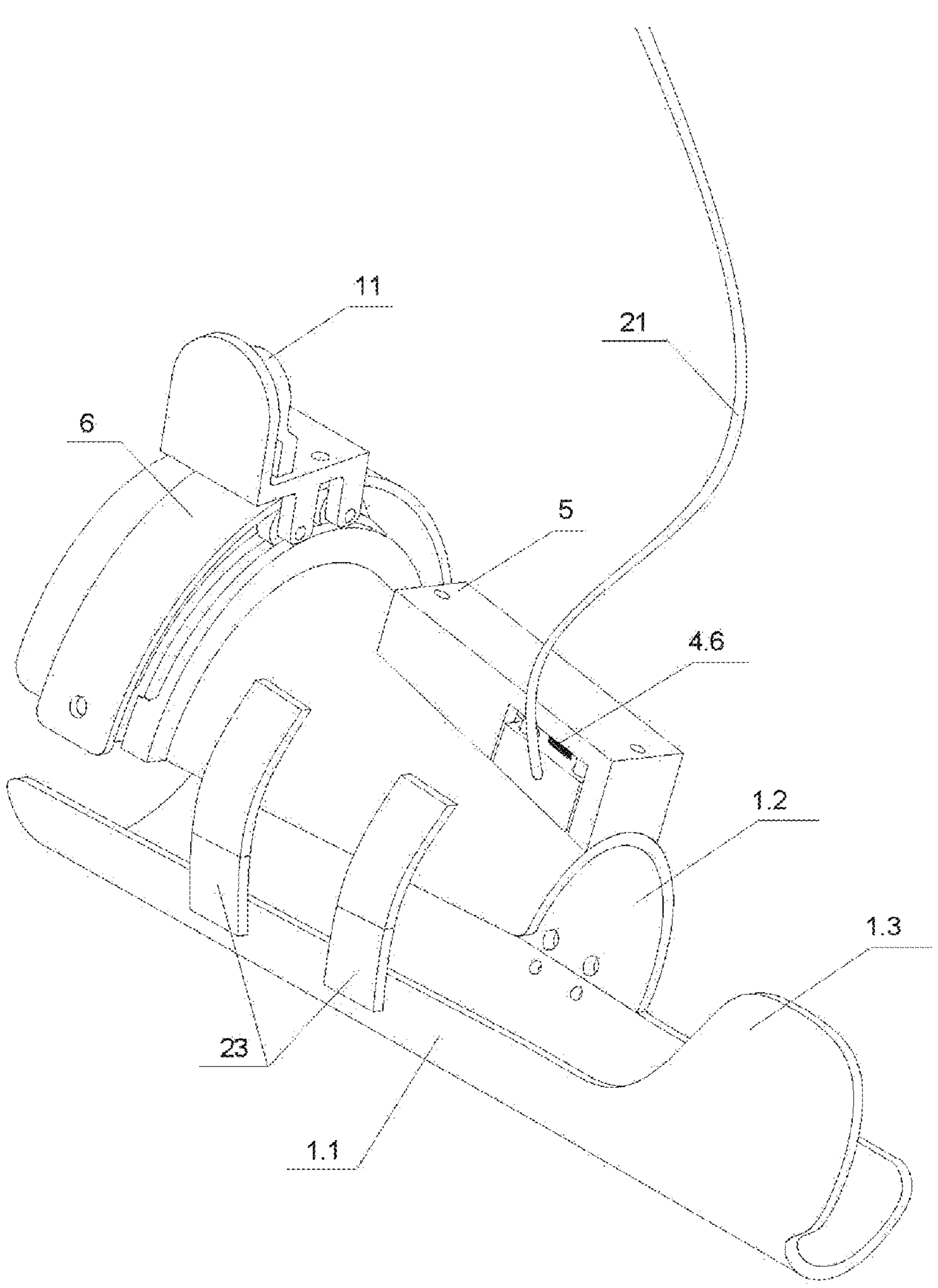
FIG. 2: Isometric projection of the sensorized wearable unit.

FIGS. 1 and 2 show a sensorized wearable unit (1) comprising an upper part (1.2) and a lower part (1.1) connected by hinges (7), that can be adjusted to the width of the user's limb due to the wearable unit opening system, which comprises one or more adaptable fasteners (23) to allow an emergency opening. In addition, an embodiment of the sensorized wearable unit (1) has a support (1.3) provided on the lower part (1.1) of the sensorized wearable unit (1) to support the wrist and hand of the user.

In another embodiment of the sensorized wearable unit (1), the lower part (1.1) attached to the limb can be disengaged from the upper part (1.2), and then subsequently attached by means of hinges (7) and/or adaptable fasteners (23), in order to make a lower part (1.1) personal for each operator, and therefore achieve a better adaptability to any user.

Regarding the manufacturing of the sensorized wearable unit (1), it can be made by any metal or non-metal forming process that achieve the required shape, by any metal or non-metal 3D printing process, or by any other manufacturing process known in the art.

Attached to the wearable unit there is a mechanical cable or wire (21) shown in FIG. 1, which directs the movement induced by one of the motors (19) provided in the actuation unit (3). The cable (21) connects the sensorized wearable unit (1) to one of the cylinders (18) at the actuation unit (3) and the purpose of which is to mechanically assist the movement of the user's limb by winding or unwinding the mechanical cable (21). Said mechanical cable (21) is shown as an example on the outside of the structure (2), but it can also be placed on the inside of the tubular shaped structure (2) to avoid hitches and facilitate the functionality of the invention. The mechanical cables (21) may be made of metal, non-metal or any material known in the art, and it is required to have enough tensile strength and fatigue strength resistance to carry the weight of the load. A preferred embodiment of the system uses a steel cable for this matter, varying its cross section depending on the load or the resistance needed.

As shown in FIG. 1, one preferred embodiment of the invention also includes a middle tubular shaped structure (2) that connects the sensorized wearable unit (1) to the actuation unit (3). Said structure (2) comprises a hollow and curved tube inside which there are electrical/signal cables (29) and mechanical cables (21). The structure (2) is used for joining the sensorized unit (1) with the actuation unit (3), in addition to containing electrical/signal cables (29) to transmit the information from the sensors (4 and 15) to the microcontroller (28), and for housing cables that carry out mechanical movements of the system induced by both motors (19).

The connection between the sensorized wearable unit (1) and the structure (2) is made through a sensorized rotative component (11) to allow rotation, flexion, and extension of the arm. In addition, this connection includes a number of curved rail components (6) to allow the arm's pronation and supination movement.

The connection between the actuation unit (3) and the structure (2) is made through a ball joint (14). This ball joint (14) permits a 360° rotation of both the structure (2) and the sensorized wearable unit (1) as a block. Furthermore, the length of the structure (2) in addition to the movement allowed with the ball joint (14) let the user reach the loads in a further location.

There is an additional connection between the upper component of the ball joint's (14) and the actuation unit (3), with a vertical linear guide (10). The linear guide (10) is moved by bearings (13) and simulates the upward movement of the user's shoulder and enlarges the distance the user can move to reach the loads. If the movement of the vertical guide (10) is motorized, the required additional motor (19) is located in the actuation unit (3). If it is not motorized, the movement is induced by the user's strength.

In other embodiments, the structure (2) can also include other ball joints and/or bearings within the structure (2), or the actuation unit (3) to increase the degrees of freedom in the system.

Attached to the actuation unit (3) there is a plurality of elements to allow the complete system to fully rotate and move through rails (26) by means of spherical and/or linear bearings (27). This subsystem comprises a cylindrical disc (24) attached to the actuation unit (3) by means of screws. Said cylindrical disc (24) rests on a rectangular plate (25) that contains spherical bearings (27) on the upper surface, so that the cylindrical disk (24) rotates and slides on them. The dimensions on the rectangular plate (25) allow the cylindrical disc (24) to move perpendicularly to the rails (26), which entails an increment of actuation length for the operator to reach the loads. In a preferred embodiment as shown in FIG. 1, the rectangular plate (25) is hollow inside, so that the bearings (27) are distributed along a perimeter strip.

The rectangular plate (25) has also on its lower base a number of bearings (27) on which it is supported, which also allow the plate to slide on the rails (26) arranged at the sides. When the operator is not making the system move, the cylindrical disc (24) moves by the action of gravity to its resting position, this is achieved by means of installing a rail (26) higher that the other, or by slightly tilting the rectangular plate (25), for example.

The rails (26) on which the system slides, make a path for the operator to move around the working area. Preferably, these rails (26) are fixed to the ceiling or to a supporting wall. The shape, length and design of the rails (26) shall determine the area of movement of the system operator. Obviously, if the system is preferably designed to help move loads for an operator from one point to another, the rails will run from a loading point to an unloading point.

FIG. 2 shows an exemplary embodiment of one of the system's sensorized wearable units (1), which is designed to be placed on a specific user's limb. The model depicted in FIG. 2 corresponds to the left side of the body of the user, but it can be modified to be positioned on the right side of the body. The exemplary embodiment of the sensorized wearable unit (1) comprises a rigid element that covers and protects the user's forearm and has an extension to support the user's articulation that has to stay immobile. It further comprises a plurality of strain sensors (4.1-4.6) placed on its inner surface and in an exterior support module (5). This support module's (5) function is to protect a sensor (4.6) placed inside it, and to attach an end of a mechanical cable (21). Said mechanical cable (21) presses the sensor (4.6) as the motor winds it, which sends that pressure information to the microcontroller (28) by electrical/signal cables (29) placed inside the structure (2). This information is used to determine the weight of the load held by the operator.

The sensorized wearable unit (1) is configured as a rigid element comprising an upper part (1.2) and a lower part (1.1) preferably connected by hinges (7). The sensorized wearable unit (1) allows the user to rotate, flex and extend his or her arm by means of a sensorized rotative component (11), and to pronate and supinate the arm by means of a curved rail component (6) adapted to the unit's external surface. In addition, the two pieces (1.1 and 1.2) of the wearable unit are meant to be locked by any kind of buckles or fasteners (23) to allow an emergency opening of the device in case it is needed while the load handling operation is in progress. Another use of said fasteners (23) is to attach the lower part of the unit (1.1) to the upper part (1.2) in case both parts of the unit are disengaged.

Thus, the sensorized wearable unit (1) can be embodied by two parts (1.1 and 1.2) connected to each other (e.g. by hinges) and closed together by means of a plurality of fasteners (23), or embodied by means of two separate parts disengaged attached by fasteners (23) or any similar element.

Within this unit (1) there are a plurality of strain sensors (4), to detect the pressure between the limb of the user and the sensorized wearable unit (1). Information gathered by these sensors (4) are processed through a microcontroller (28) and then through a computer device that controls the movement of the motors (19) arranged in the actuation unit (3).

The plurality of strain sensors (4) provided on the internal surface of the sensorized wearable unit (1), are referred in the exemplary figure as 4.1 to 4.5, and measure the pressure applied to them. Through the pressure applied to the sensors (4.1-4.5), each gearbox (22) of the motors (19) separately rotates in one direction or another, which make the mechanical cables (21) wind or unwind from each cylinder (18). That is to say, the cylinder (18) rotates in a specific direction as the applied pressure to the sensors (4) changes, depending on the movement of a user. Specifically, when the applied tension occurs on the lower part of the sensorized wearable unit (1.1), motors unwind a length of mechanical cable (21), allowing the user to lower the limb, whereas if the tension is applied to the upper part of the sensorized unit (1.2), which means the user is rising his/her arm, the motors wind the wires.

FIG. 2.1. shows the position of the strain sensors (4) within the sensorized wearable unit (1) of an exemplary embodiment. The lower part (1.1) makes contact with the palm and the ulnar wrist part of the hand, and a sensor is placed on each of both locations (4.1 and 4.2 respectively).

The interior surface (1.2.1) of the upper part (1.2) touches the radial part of the arm. Sensors (4) placed on this interior surface (1.2.1) detect the intention of the operator to lift his or her arm, and are distributed within the surface next to the edge that is placed at the wrist (referenced as sensor 4.3 and sensor 4.4), and on the opposite edge, located closer to the elbow (sensor 4.5).

The exterior part (1.2.2) has a strain sensor (4.6) inside the support module (5) to identify the tension of the cable once the motor winds or unwinds it. The strain sensors (4.1-4.5) in the inside of the sensorized wearable unit (1) detect the pressure made by the limb into the internal surface of the sensorized wearable unit (1). When the intention of the user is lowering the arm, the sensors (4.1 and 4.2) on the lower part (1.1) are pressed by the forearm, and the one linked to the cable (4.6) is pressed as well by the tension created on the cable. This action makes the motor unwind the cable to allow an extension of the arm. When the intention of the user is to lift the arm, loaded with any external weight or not, there is a detection of pressure on the sensors of the internal surface (1.2.1) of the upper part (1.2) and/or on the sensor at the palm of the hand (4.1) and the sensor at the ulnar wrist part (4.2), which make both motors function to wind the cables. Sensors (4) used are in a preferred embodiment Force Sensing Resistors, or FSRs, which are polymer thick film devices with a resistance that depends on applied force. Said sensors (4) exhibit a decrease in resistance with increase in force applied to the surface of the sensor. Exemplar embodiments of the system use FSRs working at a range from 0 to 50 kg, but it is not limited to this sensors, the range can be adapted depending on the necessities of the work.

FIG. 2.2. shows the connection between the sensorized wearable unit (1) and the structure (2). This connection is made by means of a sensorized rotative component (11) that identifies the angle the arm is with respect to a reference plane. A preferable embodiment uses a Programmable Magnetic Rotary Position Sensor, which is a contactless magnetic position sensor for accurate angular measurement over a full turn of 360°. This sensor is a system-on-chip that combines integrated Hall elements, analog front end, and digital signal processing in a single integrated circuit.

The sensorized wearable unit (1) is divided into two parts (1.1 and 1.2) that are connected through hinges (7) or any other element that enable a controlled opening and closing and an adaptation to different arm sizes. The upper part (1.2) comprises an exterior support module (5), which is installed to attach the mechanical cable (21) consequently creating a connection between the sensorized unit (1) and the motor (19), for the motor to support the weight of the load. The sensor placed inside the support module (5) is pressed, when the user lowers the arm, by the opposite force made by the tensioned cable.

In addition, this connection includes a number of curved rail components (6) to allow the arm's pronation and supination movement, both movements made by the user's action while moving his or her arm.

An embodiment of the invention also includes an actuation unit (3), which comprises the electrical, electronic, and mechanical elements of the exoskeleton system.

Figure 3:
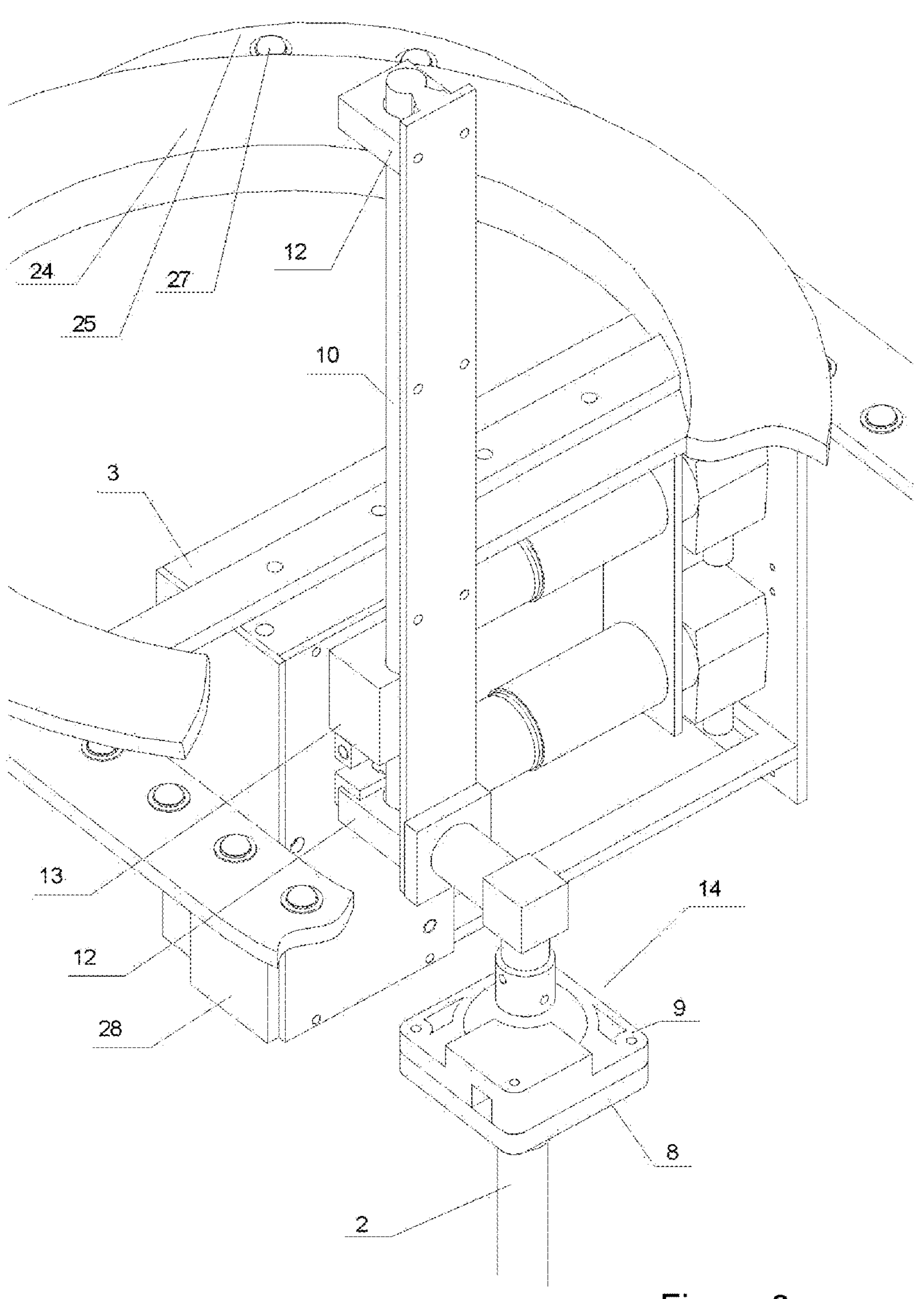
FIG. 3: Isometric projection of the actuation unit showing the connection between the unit and the structure.

FIG. 3 shows the connection between the structure (2) and the actuation unit (3). The structure (2) has at least one component that allows the complete rotation of the device (360°) which is represented on this exemplary embodiment through a ball joint (14), but it is not limited to it. The system moves in a vertical axis for the operator to reach the load at different heights, therefore allowing him or her to dispose the load evenly. This vertical movement system can be motorized, and it is represented in the model with a vertical linear guide (10) with ball bearings (13), also comprising two limit switches (12) at its limits to stop the movement. This system is attached to the actuation unit (3), which contains the motors (19) to induce the mechanical movements.

In order to permit a greater length of actuation for the operator to reach the loads, there is a cylindrical disc (24) attached to the actuation unit (3). Supporting this cylindrical disc (24) there is a rectangular plate (25) with spherical bearings (27) on its upper surface, which make the cylindrical disc (24) move from one limit of the rectangular plate (25) to the other limit, and those spherical bearings (27) also allow the cylindrical disc (24) to rotate 360°. Similar bearings (27) on the lower surface of the rectangular plate (25) allow it to slide on two rails (26) placed on opposite sides of the plate (25). These two rails (26) can be installed at two different heights to create an inclination on the rectangular plate (25) so that the cylindrical disc (24) automatically slides back to its initial location when no force is applied to it.

FIG. 3.1. shows an exploded view of the ball joint system that connects the structure (2) with the actuation unit (3). In this embodiment this connection is made by means of a ball joint (14) inside a casing. Between the lower part (8) and higher part (9) of the casing there is a plurality of position sensors (15), or Programmable Magnetic Rotary Position Sensors, to detect the rotation and movement of the ball joint inside the spherical case. Adjacent to the position sensors (15) there are two cylinders (16) that move by the action of the ball joint. Said ball joint (14) touches the cylinders (16) at all times, and when the structure is moved, the ball joint connected to it rotates each cylinder separately. Each cylinder (16) indicates the rotation degree on its corresponding sensor (15) by magnetic means.

With that ball joint's movement detected by the position sensors (15), it can be determined the position of the operator on the operating area, by knowing the angle each position sensor (15) is detecting with respect to a neutral position, normally when the ball joint is directed downward.

The microcontroller (28) processes signals from the strain sensors (4) and position sensors (15), and it is responsible for executing the control algorithm. These signals come from the strain sensors (4) and the rotative sensor (11) at the sensorized unit (1) and from the position sensors (15) actioned by the ball joint (14). The information from all the sensors reaches the control software, which is embedded in the microcontroller (28).

Figure 4:
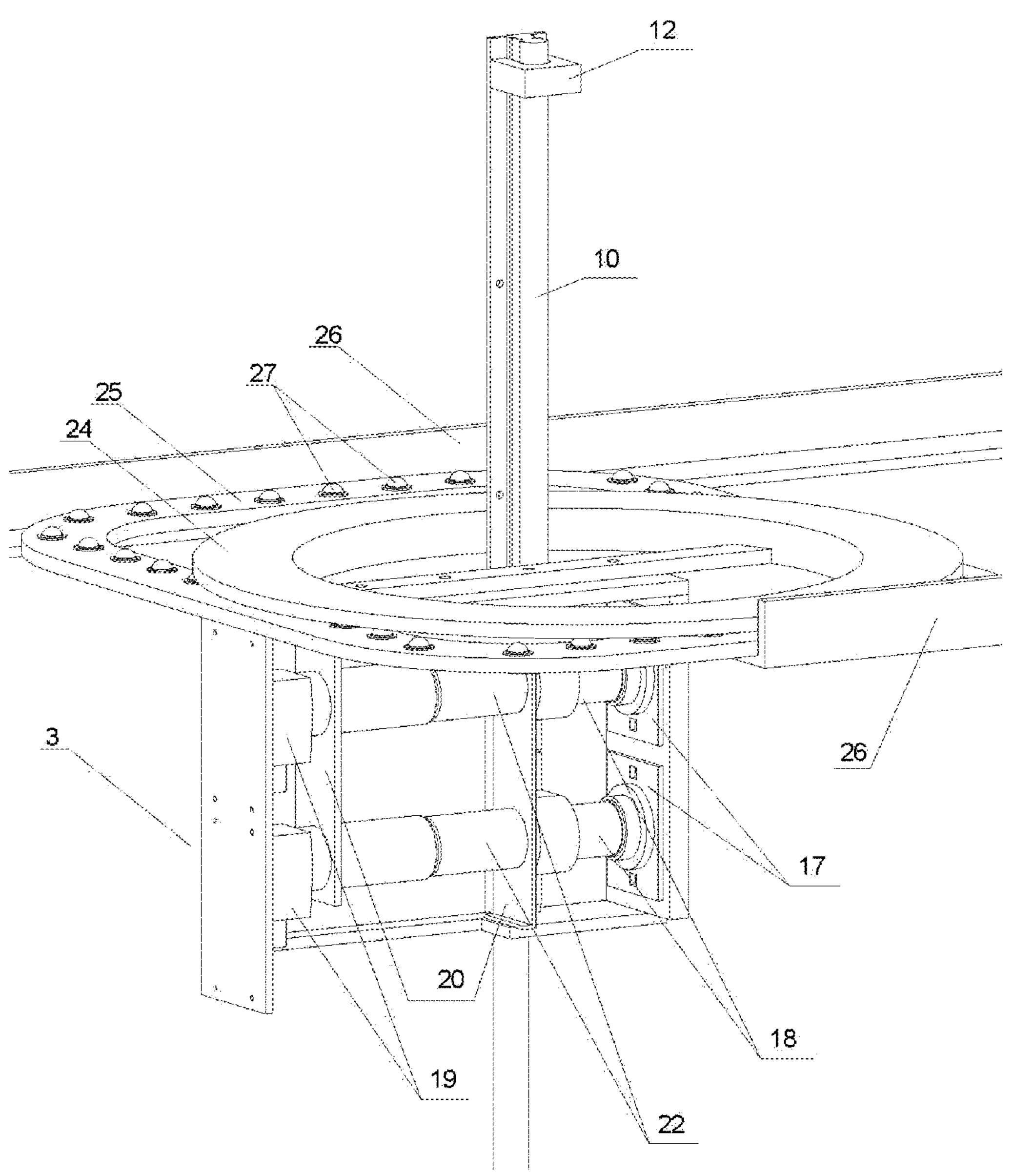
FIG. 4: Isometric projection of the actuation unit and its main elements.

FIG. 4 shows an embodiment of the actuation unit (3) of the system, which contains mechanical, electrical, and electronic components. The container may be manufactured with a material that endures the weight of the elements and the high temperatures, in case mechanical or electrical elements overheat, and to create an electromagnetic barrier between the moving elements and the power supply, and the microcontroller (28). The actuation unit (3) further comprises: a plurality of motors (19), their gearbox (22), bearings (17) for the rotation of elements, fastening elements (20) for the motors (19) and their gearboxes (22), and rotation cylinders (18) to collect a cable by coiling it around, due to the rotation generated by each motor (19).

The actuation unit (3) is held by a cylindrical disc (24), which is supported by a rectangular plate (25) with bearings (27) on the upper and lower surface. In order to increment user's range or to store the exoskeleton system out of the working area's scope. Said rectangular plate (25) slides on lateral rails (26) that are displayed within the working area and preferably attached to the ceiling or supporting walls.

The exemplary embodiment of the system depicted in FIG. 4, comprises two motors (19), one of them in charge of winding or unwinding the mechanical cable (21) attached to the sensorized wearable unit (1), and the other motor controlling the cable attached to the vertical guide (10), to lift the weight of the structure (2) and the elements connected to it.

Figure 5:
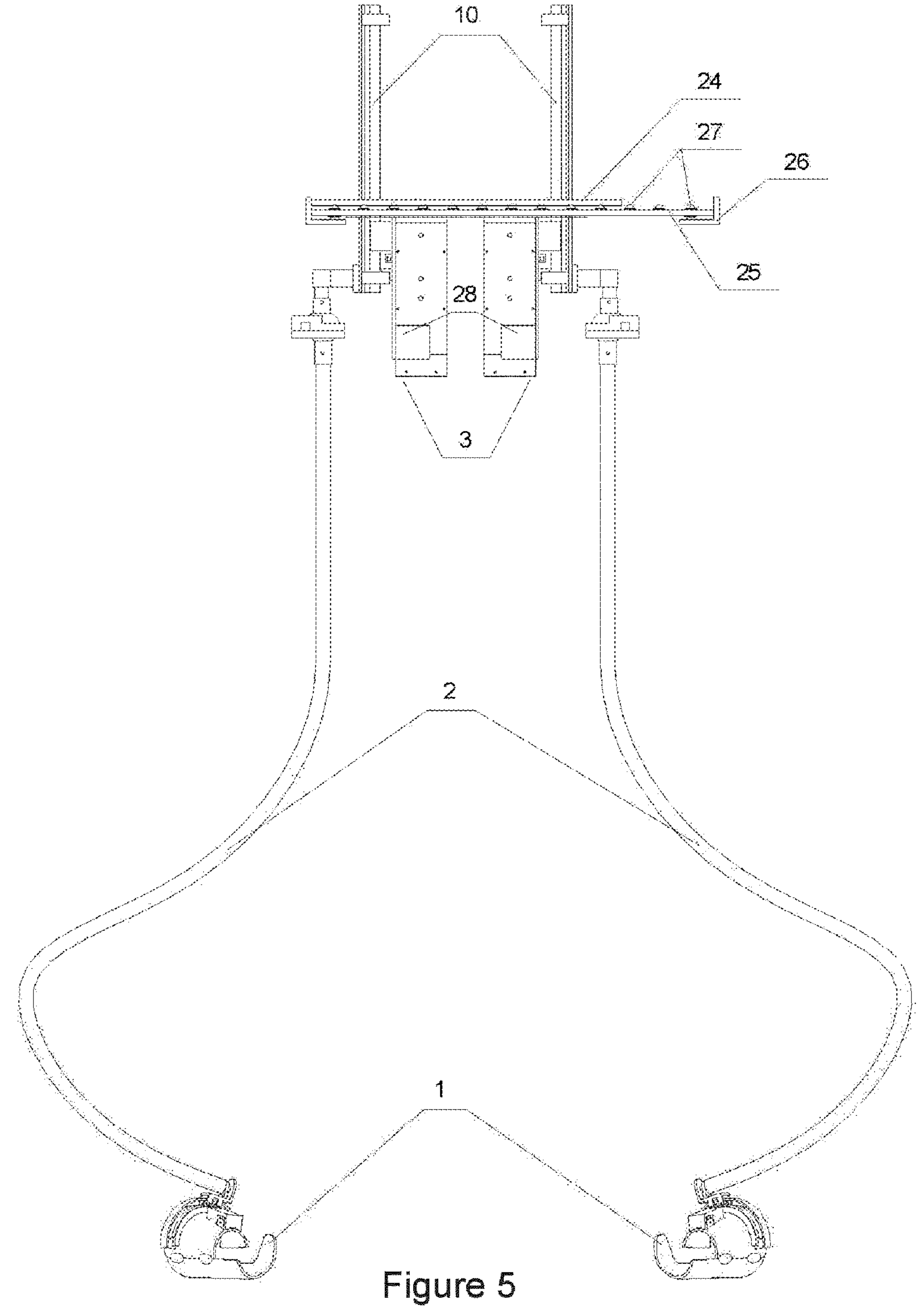
FIG. 5: Orthographic view of the exoskeleton system showing the assembled system for both arms of the user.

FIG. 5 shows another embodiment of the exoskeleton system for two arms, comprising two individual systems connected by a common cylindrical disc (24). The cylindrical disc (24) allows the operator to turn around the working area, and comfortably move the loads from one side to another if needed. This embodiment comprises an individual system faced a symmetrical one, meaning that one adapts to the right limb of the user, while the other adapts to the left side of his or her body.

As shown in the figure, in this embodiment the system comprises two sensorized wearable units (1), two structures (2), two actuation units (3) with their corresponding microcontrollers (28) and two vertical guides (10), symmetrically arranged. Obviously, the right arm system is actuated by means of two motors (19) and the right arm system by means of two other motors (19), provided in the second actuation unit (3) symmetrical with the first one. The system of the embodiment further comprises a single common cylindrical disc (24) for rotation of both individual systems, and a single common rectangular plate (25) with bearings (27) that slides through rails (26) to transport the system through the working area.

Attached to each actuation unit (3) there is a microcontroller (28) that processes the signals sent by the position sensors (15), the sensorized rotative component (11), and the strain sensors (4). These signals come from the sensors/sensorized elements and are transmitted by means of electrical/signal cables (29) connected to the microcontroller (28). The electrical/signal cables (29) are placed inside the structure (2) for their own protection, and they reach the microcontroller (28) attached to the actuation unit (3). Sensor's information reaches the control software that is embedded in the microcontroller (28).

The energy required for the operation of the entire system is obtained by a simple connection to the mains power supply.

The control system of the present invention, along with the wearable exoskeleton system, can provide assistance and an increase on the physical performance of a user, and is developed to be used in load handling jobs.

REFERENCES

To facilitate the understanding of the invention, the application comprises a series of drawings with a plurality of components listed hereunder:

1. Sensorized wearable unit
1.1 Lower part
1.2. Upper part
1.2.1. Interior surface of the upper part (1.2)
1.2.2. Exterior surface of the upper part (1.2)
1.3 Support on the sensorized unit
2. Structure
3. Actuation unit
4. Strain sensors (referenced as 4.1-4.6)
5. Support module
6. Pronation and supination guides
7. Hinges
8. Lower part casing for ball joint
9. Higher part casing for ball joint
10. Vertical guide
11. Sensorized rotative component
12. Limit switches
13. Ball bearings for vertical guide
14. Ball joint
15. Position sensors for ball joint
16. Cylinders for ball joint
17. Ball bearings for coiling the wire
18. Cylinders for coiling the wire
19. Motors 20. Fastening elements for motors
21. Mechanical Cable/Wire
22. Gearbox
23. Fasteners for sensorized units
24. Cylindrical disc
25. Rectangular plate with bearings
26. Rails for the rectangular plate
27. Bearings within the rectangular plate
28. Microcontroller
29. Electrical/signal cables

The invention claimed is:

1. A sensorized exoskeleton system for enhancing physical performances and/or for providing assistance with limb movement in regard to load-involved tasks, the system comprising:
- at least one sensorized wearable unit comprising a plurality of strain sensors configured to fit a user's forearm and to allow rotation, flexion, extension, pronation and supination of the user's arm;
- an actuation unit comprising a plurality of electrical, electronic and mechanical elements;
- a plurality of mechanical elements fixed to the ceiling or other fixed structure allowing the actuation unit to move horizontally on two rails and to rotate through 360°;
- a structure that mechanically and electrically connects the sensorized wearable unit to the actuation unit and moves along a vertical axis;
- a plurality of sensorized rotative components and position sensors installed throughout the at least one sensorized wearable unit, the structure and the actuation unit;
- at least one electronic microcontroller that processes the signals sent by the position sensors, the sensorized rotative components, and the strain sensors.

2. The sensorized exoskeleton system of claim 1, wherein the sensorized wearable unit is configured as a rigid element comprising:
- an upper part and an interchangeable and customisable lower part with a support;
- plurality of hinges and/or a plurality of adaptable fasteners for connecting the upper part and the lower part;
- a plurality of strain sensors placed on its inner surface;
- an exterior support module comprising at least one strain sensor and fixation means for a mechanical cable;
- a sensorized rotative component allowing the user to rotate, flex and extend the arm and configured to identify the angle the arm is with respect to a reference plane at all times; and
- a curved rail component allowing the user to pronate and supinate the arm.

3. The system of claim 2, wherein the plurality of strain sensors placed on its inner surface detect the user's action or movement intention by detecting the pressure between the limb and the unit at different points of the sensorized wearable unit, depending on the direction to where the user moves the limb.

4. The system of claim 3, wherein the plurality of strain sensors are Force Sensing Resistors that exhibit a decrease in resistance with increase in force applied to the surface of the sensor.

5. The system of claim 2, wherein the at least one strain sensor placed inside the support module's detects the pressure exerted by the mechanical cable as the motor winds it and sends that pressure information to the microcontroller, this information being used to determine the weight of the load held by the user.

6. The system of claim 2, wherein the sensorized rotative component comprises a Programmable Magnetic Rotary Position Sensor.

7. The sensorized exoskeleton system of claim 1, wherein the structure that mechanically and electrically connects the sensorized wearable unit to the actuation unit comprises a hollow and curved tube configured to house electrical/signal cables to transmit the information from sensors to a microcontroller and mechanical cables that carry out mechanical movements of the system induced by motors housed in the actuation unit.

8. The sensorized exoskeleton system of claim 1, wherein the length of the structure can be adjusted to suit the user's height and in that the structure is configured to allow movements of rotation, flexion, extension, adduction, and abduction of the limbs of the user.

9. The sensorized exoskeleton system of claim 1, wherein the connection between the actuation unit and the structure is made through a ball joint, comprising a spherical casing with a lower part and higher part that houses a plurality of position sensors to detect the rotation and movement of the ball joint by means of rotating cylinders.

10. The sensorized exoskeleton system of claim 1, wherein the actuation unit comprises:
- a plurality of motors with their respective gearboxes;
- a plurality of cylinders to wind or unwind mechanical cables depending on the rotation generated by each motor;
- a plurality of bearings;
- a plurality of fastening elements for the motors and their gearboxes;

and further wherein:
- the pressure applied to the sensors, is sent to and processed by the microcontroller, which then actions the motors of each gearbox separately rotating in one direction or another, which make the mechanical cables wind or unwind from each cylinder.

11. The sensorized exoskeleton system of claim 1, wherein the plurality of mechanical elements fixed to the ceiling or other fixed structure allowing the actuation unit, to move horizontally on two rails and to rotate through 360° comprise:
- a vertical linear guide with ball bearings to move the structure along a vertical axis, also comprising two limit switches at its limits;
- a cylindrical disc attached to the actuation unit;
- a hollow rectangular plate that contains spherical bearings on the upper surface and on its lower base, and further wherein:
- the cylindrical disk rotates and slides on the spherical bearings provided on the upper surface; and
- the rectangular plate slides on the rails thanks to the bearings arranged perimetrically on its lower base.

12. The sensorized exoskeleton system of claim 11, further comprising a motor provided in the actuation unit for controlling a mechanical cable attached to the vertical guide, to lift the weight of the structure and the elements connected to it.

13. The sensorized exoskeleton system of claim 11, wherein in the absence of any external force, the cylindrical disc moves by the action of gravity to its resting position, this being achieved either by means of installing a rail higher than the other, or by slightly tilting the rectangular plate.

14. The system according to claim 1, wherein the microcontroller processes the signals from the strain sensors, from the rotative sensor at the sensorized unit and from the position sensors actioned by the ball joint by means of a control software, which is embedded in the microcontroller.

15. The system according to claim 1, wherein the system is configured for use with two arms, the system comprising:

two sensorized wearable units, two structures, two actuation units with their corresponding microcontrollers, and two vertical guides, symmetrically arranged;

and further comprising;

a single common cylindrical disc, a single common rectangular plate with bearings, and a pair of common rails to transport the system through the working area.

* * * * *